Dec. 18, 1945.　　　　W. STRAUSS　　　　2,391,362
OPERATION CHECK AND CONTROL SYSTEM FOR MOLDING MACHINES
Filed May 19, 1944
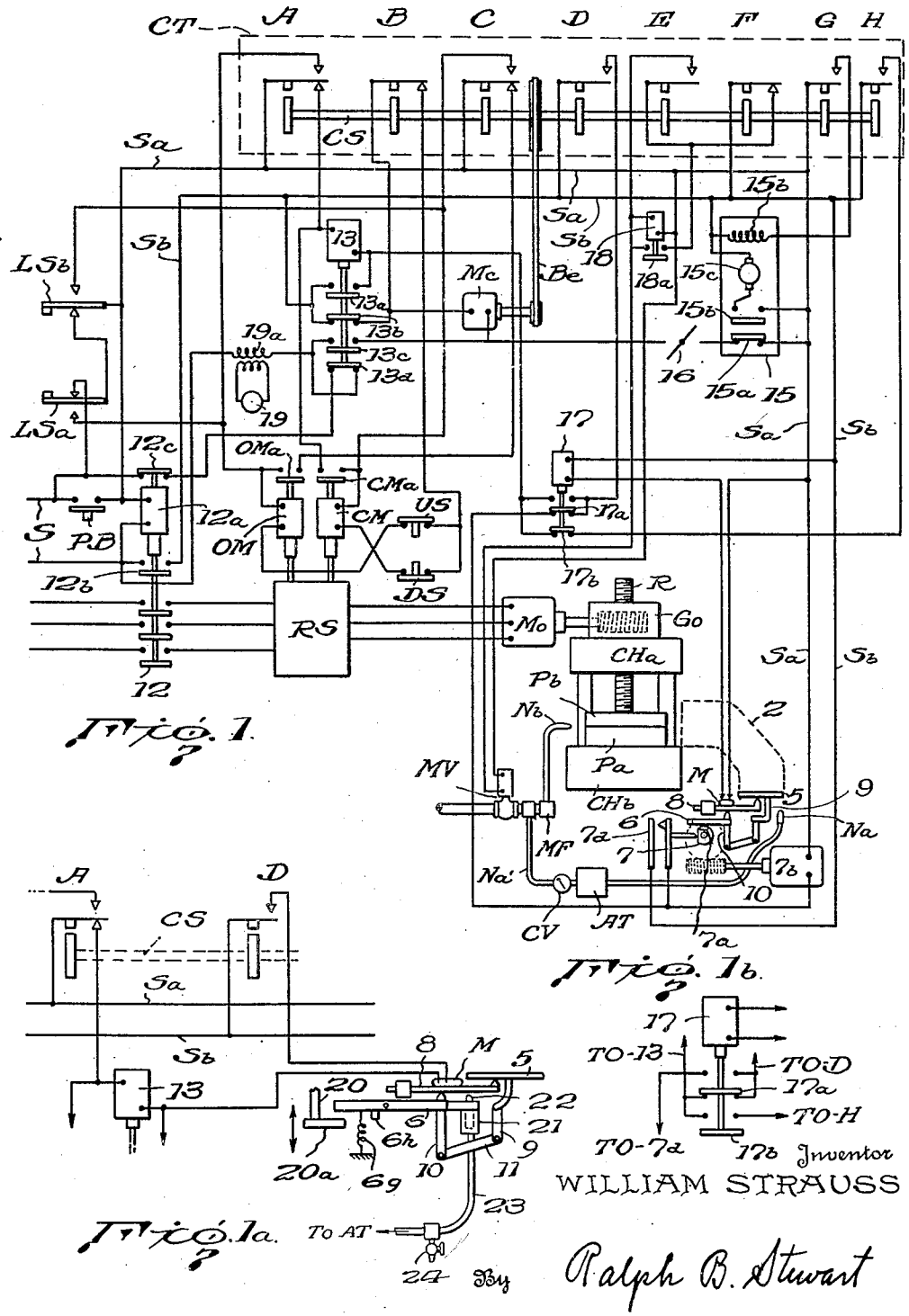
Inventor
WILLIAM STRAUSS
By Ralph B. Stewart
Attorney Patented Dec. 18, 1945

2,391,362

UNITED STATES PATENT OFFICE 2,391,362

OPERATION CHECK AND CONTROL SYSTEM FOR MOLDING MACHINES

William Strauss, Philadelphia, Pa., assignor to F. J. Stokes Machine Company, a corporation of Pennsylvania Application May 19, 1944, Serial No. 536,334

11 Claims. (Cl. 18—16)

This invention relates to a safety system for checking the operation of an automatic molding machine or press and for stopping the press when it fails to discharge a molded article, or the proper number of articles, in any molding cycle.

This application is in part a continuation of my copending application Serial No. 415,960 filed October 21, 1941, that is, one form of control system disclosed herein is disclosed in my earlier application (Patent No. 2,371,077, March 6, 1945). The present application also discloses a modified form of control system and a modified form of safety device.

An object of the present invention is to devise an improved control system for controlling the operation of a molding press and for checking its operation by my improved safety device.

Another object is to devise novel and improved means for resetting the safety device after each checking operation and preparing the device for operation in a succeeding cycle.

Still another object is to provide a checking circuit to stop the operation of the press in case the weighing plate is not returned to its normal position after each operation.

A further object is to devise means to prevent the false operation of the safety device by the air blast employed to discharge the molded articles from the press.

According to my invention I provide a substantially horizontal weighing plate mounted for limited vertical movement with respect to a normally stationary support, and the support is pivotally mounted for tilting the weighing plate from the horizontal position. The limited vertical movement of the horizontal weighing plate with respect to the pivoted support controls an electric switch which in turn controls the press to continue operation from one cycle to another, and the switch also initiates operation of a suitable power device, such as an electric motor, for operating the pivoted support to tilt the weighing plate out of the horizontal position and thereby permit the molded articles to slide from the plate by gravity. The pivoted support is operated through a complete cycle and returned to its normal position.

The invention also involves pneumatically actuated means for preventing operation of the weighing plate by the blast of air employed to discharge the articles from the molding press, such means being energized from the same source of compressed air and simultaneously with the operation of the discharging jet.

My invention is illustrated in the accompanying drawing in which

Figure 1 is a schematic diagram showing one example of a complete control system for controlling the operation of a molding press;

Figure 1a is a fragmentary diagram showing a modified arrangement for tilting the weighing plate of the safety device, and also showing a modified arrangement for preventing operation of the weighing plate by the article discharging air blast; and Figure 1b is a fragmentary diagram showing a modification of the control circuit of Figure 1.

The safety device employed in Figure 1 is described in greater detail in my copending application Serial No. 415,960, filed October 21, 1944. It involves weighing plate 5 for receiving the articles which are discharged into the chute 2 from the press.

Plate 5 is pivotally mounted to permit limited vertical movement under the weight of the article discharged into the chute, and the plate is also pivotally mounted to permit tilting so that the discharged articles will slide from the plate by gravity.

The mounting for the plate 5 includes a plate 6 pivotally supported in a substantially horizontal position between a pair of pivot screws near the rear edge of the plate. The plate 6 is normally held in a substantially horizontal position by means of a lateral projection 7a carried by cam disc 7 which is mounted on a shaft journaled in a fixed support.

A lever 8 is pivotally supported upon plate 6 near the front edge thereof and plate 5 is mounted on pivotal supports carried by lever 8. For the purpose of maintaining plate 5 in a normally horizontal position, a rigid arm 9 is secured to the plate and extends downwardly therefrom. A similar rigid arm 10 is secured to plate 6 and extends downwardly therefrom. The lower ends of these two rigid arms are joined together by a link 11 pivotally connected to the two arms. This construction forms a parallelogram between the four pivot points, and plate 5 is maintained in a horizontal position when the plate is depressed under the weight of the molded article and the lever 8 is tilted about its supporting pivots. A stop is provided to limit the amount of pivotal movement of the lever 8 with respect to the plate 6, and to thereby limit the amount of downward movement of the plate 5 under the weight of the molded articles.

The rear end of lever 8 is threaded, and one or more threaded counterweights are supported on the threaded end of lever 8 for counterbalancing the weight of plate 5 and its supporting parts. Preferably the counterbalance more than compensates for the plate 5 and its supporting elements and supplies a biasing force urging the plate 5 upwardly against a fixed stop.

The safety device may be adjusted for articles of different weights by adjusting the position of counter-weights on lever 8. When properly adjusted, plate 5 will be depressed by an article of proper weight but not by an article which is underweight. Also, where the device is used to check the operation of a multiple cavity press, the plate will be depressed when the correct number of articles have been deposited on the plate, but will not respond if one or more articles is missing.

As explained above, pivoted plate 6 is maintained in a substantially horizontal position by means of projection 7a on cam disc 7, and the plate 6, together with the plate 5 mounted thereon, may be moved to a tilted position by rotating the cam disc 7. The shaft of the cam 7 is rotated by a motor 7b through suitable speed reducing gearing. Cam disc 7 is provided with a flat portion on its periphery, and a normally open microswitch 7d is mounted with its operating arm positioned adjacent the flat portion of the cam wheel, so that the switch is normally open when plate 6 is maintained in its horizontal position, but rotation of cam 7 will cause the switch 7d to close and remain closed for a complete rotation of the cam.

A mercury type of switch M is mounted on pivot lever 8, and this switch is preferably mounted in a position such that the contacts of the switch are normally bridged by the mercury when lever 8 is in the horizontal position shown in Figure 1, but when the lever is tilted, the mercury in the switch runs by gravity to the righthand end of the switch envelope and interrupts the circuit between the contacts.

A jet nozzle Na is mounted below and to one side of plate 5 and is arranged to direct a jet of air against the underside of plate 5 simultaneously with the blowing of the molded article from the press by an air blast. Thus the jet produced at nozzle Na will counteract any pressure on the upper face of plate 5 which may be caused by the air blast employed to discharge the article from the press into the safety device.

Figure 1 is a diagrammatic showing of a molding press, illustrating one arrangement of electric control circuits therefor, including the operation check described above. Any suitable type of molding press may be employed, but for the purpose of illustration, I have shown a mechanical type of press involving an upper crosshead CHa and a lower crosshead CHb carrying the lower mold platen Pa, while the upper mold platen Pb is carried by a threaded ram R which is raised and lowered by any suitable power means such as motor Mo operating through suitable gearing represented as Go. Various details of the press, such as the knock-out pins, the feeding device, etc., are not shown since they are not necessary to explain the operation of the control system. Motor Mo is controlled by a reversing switch RS which in turn is controlled by electromagnets OM and CM to drive the motor in proper directions to open and close the press, respectively. The circuit to motor Mo is also controlled by an electrically operated main switch 12, having an operating winding 12a.

Current for energizing winding 12a and for energizing the various control circuits is supplied from a suitable supply circuit S. A normally open push-button PB controls the circuit to winding 12a, and the contacts of this push-button are normally bridged by a connection including a normally closed contact on limit switch LSa, and a normally closed contact on limit switch LSb. A conductor Sa is connected to one conductor of circuit S through the bridging connection completed by limit switches LSa and LSb, and a supply conductor Sb is connected to the other conductor of circuit S through contact 12b on main switch 12 when this switch is in closed position. Current for operating the various control relays is supplied from conductors Sa and Sb, and these relays and circuits are controlled in timed relation by a controller represented within the dotted rectangle CT. This controller may be of any suitable construction consisting of a number of control switches A, B, C, D, E, F, G, H, operated in predetermined timed relation by suitable means, such as that shown in U. S. Patent 2,250,342, but for the purpose of illustration, I have shown the operating means as involving individual cam elements mounted on a rotary shaft CS driven from a controller motor Mc through a suitable driving connection represented by the belt Be. As will be seen from the drawing, switches B and F are single-pole normally closed switches, switches D, E, G and H are single-pole normally open switches, and switches A and C are single-pole double-throw switches with the front contacts thereof normally closed. Preferably, all of the switches A to H inclusive are operated by the associated cams so that they are moved only momentarily from their normal position to their operated position and then returned to the normal position. Each cam disc may have one or more operating projections as required, and the cams are angularly adjustable on shaft CS.

Current for energizing magnets OM and CM is supplied through a common connection from conductor Sb through normally closed contact 13b of stopping relay 13, through controller switch B, and from this point the two magnet circuits divide and the circuit for magnet OM is completed through the "up" limit switch US, through magnet OM, through the back contact of controller switch A, and back to conductor Sa. Magnet OM closes contact OMa to complete a holding circuit for the magnet through the front contact of controller switch C to conductor Sa. The circuit to magnet CM is completed through the "down" limit switch DS through magnet CM, and through the back contact of controller switch C, to conductor Sa. Magnet CM closes contact CMa to complete a holding circuit for this magnet through the front contact of switch A to conductor Sa.

Current for operating the controller motor Mc is supplied from conductor Sa through a normally closed contact 15a of timing relay 15, through a hand operated switch 16, through the motor Mc, and through normally closed contact 13b on relay 13, back to conductor Sb.

The energizing circuit for relay 13 extends from conductor Sa through the front contact of switch A, through the relay 13, and then the circuit divides and may be completed through contact 17a on relay 17, to switch D, to conductor Sb, when relay 17 is energized, or, it is completed through contact 17b and through switch H to conductor Sb when relay 17 is de-energized. A holding circuit for relay 13 is completed from the relay winding through contact 13a to conductor Sb when the relay is energized.

Checking relay 17 is energized from supply conductors Sa and Sb through a circuit controlled by normally closed checking switch M in the safety device.

Controller switches E and F control a circuit for energizing magnet valve MV which supplies air to air jets Na and Nb. Switches E and F also energize locking relay 18 having a contact 18a which bridges the contacts of switch E and completes a holding circuit for itself through switch F.

Controller switch G controls the circuit for energizing the clutch coil 15d of a time relay 15 which may be of any suitable construction, such as the relay shown in United States Patent 2,175,865. When the clutch coil is energized, it opens the normally closed contact 15a and closes the normally open contact 15b to energize the motor element 15c of the relay. The motor begins driving the time mechanism and after a predetermined time, contacts 15a and 15b are released and returned to their normal position.

A signal device 19 which may take the form of an audible signal or a visible signal, or both, is energized through a transformer 19a having a primary circuit extended from the lower conductor S through the transformer 19a, and from this point a circuit is completed through contact 13d of relay 13 when this relay is de-energized, through contact 12c when relay 12 is de-energized, and back to the upper conductor S. When relay 13 is energized, the primary circuit of transformer 19a is completed through contact 13c on relay 13, through hand switch 16 and through contact 15a on time relay 15 to conductor Sa which in turn is connected to the upper conductor S through limit switches LSa and LSb.

The operation of the arrangement shown in Figure 1 is as follows: It will be assumed that main switch 12 is closed and relay 17 is energized. It will also be assumed that the press is closed and is ready to be opened at the end of a molding cycle. Switch A is operated momentarily by the controller to close the circuit to "open" magnet OM which operates and starts motor Mo in a direction to raise the upper platen. Magnet OM establishes its own locking circuit through contacts OMa and through switch C.

During the upward movement of the upper platen, and after the molded articles have been ejected from the mold cavities in the lower platen, or concurrently therewith, switch E operates momentarily to energize the control relay 18 which in turn completes a holding circuit for itself through its contact 18a and through the normally closed contacts of switch F back to conductor Sb. The contact 18a on relay 18 closes the circuit to energize magnet valve MV which admits air to nozzle Nb which directs a blast of air across the space between the platens Pa and Pb to discharge the molded articles into the chute 2 of the safety device. The valve MV also controls the admission of air to the nozzle Na through the connection Na', thus supplying a blast of air against the underside of weighing plate 5 at the same time that the articles are being discharged by the blast of air from nozzle Nb. After a predetermined time, switch F is momentarily opened to de-energize relay 18 and thereby de-energize magnetic valve MV.

As the upper platen continues to rise, a suitable feeding device, not shown, supplies a new charge of molding material to the mold cavity or cavities in the lower platen Pa. On continued upward movement of the upper platen, the circuit of the magnet OM will be interrupted by the limit switch US which is located on the press in a position to be operated by a part driven by the ram R. This will stop the press and it will remain stopped until operation of the controller switch C which will then start motor Mo in a direction to close the press. If desired, switch C may be set to operate and reverse motor Mo before the ram reaches a position to open limit switch US.

Some time after the molded articles have been discharged into the safety device, and at a time when the articles are resting upon plate 5, switch D closes momentarily and completes a circuit to control magnet 13 through a contact on control relay 17, provided relay 17 is energized. Relay 17 is normally energized, since its energizing circuit is normally completed through the mercury switch M mounted on lever 8 in the safety device. However, if a molded article has been deposited on weighing plate 5, the circuit to relay 17 is interrupted at switch M and this relay will prevent the closing of the circuit to relay 13. Switch D, however, completes a circuit from conductor Sa through switch D, through contact 17a on relay 17, through motor 7b and back to supply conductor Sa. Motor 7b begins to operate and rotate the cam 7 which in turn closes switch 7d to maintain the circuit of the motor closed independently of the switch D. The motor 7b continues to operate and drive the cam 7 through a complete rotation until switch 7d opens and interrupts the motor circuit, thus causing the weighing plate 5 to tilt and discharge the molded article or articles into a suitable receptacle or hopper Ho shown in Figure 2, and to return to its original position for another operation.

If the press fails to discharge an article of the proper weight, or fails to discharge the proper number of articles to depress the plate 5, then relay 17 will be energized at the time switch D operates, and the circuit to stopping relay 13 will be completed through contact 17a on relay 17. Operation of relay 13 will interrupt the current to switch magnets OM and CM, and to the controller motor Mc, thus stopping power motor Mo and controller motor Mc. Relay 13 also closes a circuit to energize signal 19 through its contact 13c, and this signal will continue to operate until an attendant discovers and remedies the cause for the improper operation of the press.

The checking operation described above may take place at any time during the molding cycle after the molded articles have been discharged from the press into the safety device, but I prefer to set switch D for operation to stop the press before a new charge of material is fed to the lower platen, in case an article is not discharged into the safety device.

In continuing through another molding cycle, the upper platen is driven downwardly by the motor Mo controlled by switch C, and the downward movement of the platen may be stopped after the platens have closed, either by operation of switch B, or by opening of lower limit switch DS which may be mounted upon the press in a position to be operated by a movable part of the press after sufficient pressure has been developed between the two platens. For example, the lower platen may be supported on springs so that it will be depressed by the upper platen, and switch DS may be operated by a predetermined movement of the lower platen, see Patent 2,242,189. If it is desired to allow for "breathing" of the mold, provision is made to raise the ram by operation of switch A, and after the ram has been raised to a predetermined amount switch B operates to stop the ram, and after a certain time allowed for breathing, switch C will operate to drive the ram back to closed position.

When the upper platen is operated to closed position for molding, switch G is operated momentarily to energize clutch coil 15b on time-relay 15, and this opens contact 15a and closes contact 15b to start counting the curing time. The controller motor is stopped by the opening of contact 15a, and this circuit remains open until the time-relay 15 counts off the curing time and releases contacts 15a and 15b, thus reenergizing the control motor and continuing the controller through its cycle to open the press by operation of switch A.

Switch H of the controller is set to operate some time after operation of switch D and at a time when the plate 5 has been returned to its normal position in readiness for another operation. If plate 5 is in its normal position, relay 17 will be energized, and the circuit to stopping relay 13 through switch H will be interrupted at the contact 17b on relay 17. If for any reason the plate 5 has not been returned to its normal position at the time switch H closes, the circuit to relay 13 will be completed through switch H and through contact 17b, thereby energizing relay 13 and interrupting the current to reversing switch magnets OM and CM, and to the control motor Mc, thus stopping the press. The relay 13 will also close a circuit to energize signal 19 through its contact 13c, and the signal will continue to operate until an attendant discovers and remedies the difficulty.

Limit switches LSa and LSb are provided on the press and are operated by some moving part of the press so that switch LSa is operated if the press overruns in closing, and switch LSb is operated if the press overruns in opening. Operation of either switch opens the bridge circuit around push-button PB and thereby opens the main line switch 12, and also de-energizes all relays which are energized from conductors Sa and Sb. The opening of switch 12 closes a circuit for energizing signal 19 through contact 12c. It will also be noted that operation of switch LSa prepares a circuit for energizing the opening magnet OM, while operation of switch LSb prepares a circuit for energizing closing magnet CM. Accordingly, when either switch operates, the press may be brought back to normal position simply by pressing push-button PB which closes the main line switch 12 and re-energizes conductors Sa and Sb.

While the checking operation provided by switch H is desirable, it is not essential, and switch H may be omitted if desired.

Where the supply line leading from control valve MV to the air nozzle Nb is larger than the supply line Na' leading to nozzle Na, the difference in size of the supply lines may result in an accumulator effect in the larger supply line which tends to cause the blast from nozzle Nb to continue for a time after closing of valve MV. This is especially true where a number of nozzles Nb are supplied from a manifold MF. Where the accumulator effect in the connections to the nozzle Nb becomes appreciable, I provide an accumulator tank AT in the connection Na' leading to nozzle Na, and I also insert a check-valve CV between the tank AT and the control valve MV to permit air to enter the tank AT but prevent back-flow. The accumulator action of the tank AT maintains the blast at the nozzle Na until after the blast at nozzle Nb ceases, thus preventing operation of the safety device by the blast from nozzle Nb after the valve MV has been closed. The presence of check-valve CV prevents flow of air under pressure from tank AT to the nozzle Nb after the valve MV closes. A separate accumulator tank is not required but the desired effect can be obtained by using connections of proper size between check-valve CV and nozzle Na.

The pivot plate 6 may be tilted mechanically by some moving part of the press, and it is not essential to use a separate motor for this purpose. For example, as shown in Figure 1a, the pivoted plate 6 may be normally biased by a spring 6g or other biasing means against a fixed stop 6h to hold the plate in its normally horizontal position but permitting the plate to be tilted downwardly. The plate 6 is tilted downwardly and returned to its normal position once during each cycle by a suitable mechanical connection, such as the rod 20 carrying a finger 20a for engaging the underside of a projecting portion of the plate 6 on the back side thereof, the rod 20 being mechanically connected and reciprocated vertically by some part of the press. For example, it may be driven by the upper platen or by some other movable element driven by the ram. Where the plate 7 is tilted mechanically, the switch M may be connected directly in the circuit of checking relay 13, as shown in Figure 1a. The remaining connections of the control system would be in accordance with Figure 1 except that switch H, relay 17 and motor 7b with their connections are omitted.

Figure 1a also shows a modified arrangement for preventing false operation of the safety device by the air blast from jet Nb. In this arrangement a pneumatic cylinder 21 is carried by pivoted plate 6 to move therewith and is positioned directly below the front portion of pivoted lever 8. Cylinder 21 is provided with a piston or plunger 22 which is arranged when operated to engage lever 8 and prevent downward movement of the plate 5 by the blast from jet Nb. Normally, plunger 22 is held in retracted position by a suitable spring or other biasing means. Cylinder 21 is supplied with compressed air from accumulator tank AT through a flexible connection 23, and an adjustable bleeder valve 24 is connected in the supply line to bleed off or relieve the pressure in cylinder 21 after the valve MV has been closed. The operation of Figure 1a will be obvious from the previous description of the operation of Figure 1. The plunger 22 holds the plate 5 against downward movement while the air jet Nb is operating, and it continues to hold the plate against movement for a short time after the air has been cut off by the valve MV. As soon as the trapped air in accumulator AT has leaked off to a pressure which permits plunger 22 to retract, the plate 5 will then be depressed by the article or articles which have been deposited on the plate. From the above it will be seen that the plunger 22 in Figure 1a constitutes a retractile stop for holding plate 5 against movement when the stop is moved into operative position by the pneumatic cylinder 21.

Instead of mounting switch M so that it is normally closed, this switch may be mounted to be normally open. In this case, the contacts on relay 17 must be modified as shown in Figure 1b so that the contacts which previously were normally closed will be open, and the contacts which previously were normally open will be closed.

The arrangement for tilting the weighing plate to discharge the articles therefrom, which may be termed an unloading means, may be operated by an electromagnet instead of a motor, or by other electrically controlled means such as an air cylinder or an hydraulic cylinder.

In the appended claims, the term "pneumatically operated means" is intended to apply to either jet $Na$ or the cylinder piston combination 21—22 for preventing operation of the safety device by the blast from jet $Nb$.

I claim:

1. In combination, a molding press having a movable part for opening and closing the mold, power means for operating said movable part through a succession of molding cycles, an air-jet arranged to discharge molded articles from said press by a blast of air, a safety device positioned in line with said blast to receive the articles discharged from said press and including a movable control element to be operated by said articles to control the continued operation of said power means, pneumatically operated means positioned to exert a force against said movable element in opposition to the blast from said jet, a source of air under pressure and connections from said source to said air-jet and said pneumatic means, control means operated in timed relation with said movable part for simultaneously supplying air from said source to each of said connections for a portion of each molding cycle, and means for continuing the force from said pneumatic means until the air blast from the jet has ceased to be effective.

2. In combination, a molding press, an air jet arranged to discharge molded articles from said press by a blast of air, a safety device positioned in the path of said blast to receive the discharged articles and including a movable element to be operated by said articles, pneumatically operated means positioned to exert a force against said movable element in opposition to the blast from said jet, a source of air under pressure and connections from said source to said air jet and said pneumatic means, a common control valve for controlling the supply of air to said connections, and a check-valve included in the connection to said pneumatic means to prevent back-flow of air therein after closing of said control valve.

3. A combination according to claim 2 wherein the connection to the pneumatic means includes an air accumulator connected between the check-valve and the pneumatic means, whereby the force from the pneumatic means remains effective for a time after closing of said control valve.

4. In combination, a molding press having a movable part for opening and closing the mold, power means for operating said movable part through a succession of molding cycles, an air-jet arranged to discharge molded articles from said press by a blast of air, a safety device positioned in line with said blast to receive the articles discharged from said press and including a movable control element to be operated by said articles to control the continued operation of said power means, a second air-jet positioned to direct a blast of air against said movable element in opposition to the blast from said first jet, a source of air under pressure and connections from said source to each of said air-jets, control means operated in timed relation with said movable part for simultaneously supplying air from said source to each of said connections for a portion of each molding cycle, and means for continuing the air blast from said second jet until the air blast from the first jet has ceased to be effective.

5. In combination, a molding press, an air jet arranged to discharge molded articles from said press by a blast of air, a safety device positioned in the path of said blast to receive the discharged articles and including a movable element to be operated by said articles, a second air-jet positioned to direct a blast of air against said movable element in opposition to the blast from said first jet, a source of air under pressure and connections from said source to each of said air jets, a common control valve for controlling the supply of air to said connections, and a check-valve included in the connection to said second jet to prevent back-flow of air therein after closing of said control valve.

6. A combination according to claim 5 wherein the connection to the second air-jet includes an air accumulator connected between the check-valve and the second air-jet, whereby the blast from the second air-jet remains effective for a time after closing of said control valve.

7. A combination according to claim 1 wherein said pneumatically operated means comprises a pneumatically operated plunger positioned to engage and hold said movable control element against movement by the blast from said jet.

8. A combination according to claim 2 wherein said pneumatically operated means comprises a pneumatically operated plunger positioned to engage and hold said movable control element against movement by the blast from said jet.

9. A combination according to claim 2 wherein said pneumatically operated means comprises a pneumatic cylinder having a piston therein positioned to engage said movable element and prevent operation thereof by a blast from said jet, and including an air accumulator connected between the check-valve and the pneumatic cylinder, whereby said piston remains effective for holding said movable element against movement for a time after closing of said control valve.

10. In combination, a molding press having a movable part for opening and closing the mold, power means for operating said movable part through a succession of molding cycles, an air-jet arranged to discharge molded articles from said press by a blast of air, a safety device positioned in line with said blast to receive the articles discharged from said press and including a movable control element to be operated by said articles to control the continued operation of said power means, said movable control element comprising a substantially horizontal weighing plate mounted for limited vertical movement under the weight of said articles, a retractile stop arranged when operated to prevent downward movement of said weighing plate but normally maintained in retracted position, pneumatic means for operating said stop to operative position, a source of air under pressure, connections from said source to said air jet and said pneumatic means, and control means for simultaneously supplying air from said source to each of said connections for a portion of each molding cycle.

11. In combination, a molding press having a movable part for opening and closing the mold, power means for operating said movable part through a succession of molding cycles, an air-jet arranged to discharge molded articles from said press by a blast of air, a safety device positioned in line with said blast to receive the articles discharged from said press and including a movable control element to be operated by said articles to control the continued operation of said power means, said movable control element comprising a substantially horizontal weighing plate mounted for limited vertical movement under the weight of said articles, a pneumatic cylinder having a piston positioned when actuated to serve as a stop for preventing downward movement of said weighing plate, a source of air under pressure, connections from said source to said air jet and said cylinder, and common control means for simultaneously supplying air from said source to each of said connections for a portion of each molding cycle.

WILLIAM STRAUSS.